US008453523B2

(12) United States Patent  
Sato

(10) Patent No.: US 8,453,523 B2  
(45) Date of Patent: Jun. 4, 2013

(54) MAGNETIC FORCE SENSOR

(75) Inventor: Shuuichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 12/663,747

(22) PCT Filed: Aug. 13, 2008

(86) PCT No.: PCT/JP2008/064767  
§ 371 (c)(1),  
(2), (4) Date: Dec. 9, 2009

(87) PCT Pub. No.: WO2009/028355  
PCT Pub. Date: Mar. 5, 2009

(65) Prior Publication Data  
US 2010/0175487 A1 Jul. 15, 2010

(30) Foreign Application Priority Data  
Aug. 28, 2007 (JP) .................. 2007-221295

(51) Int. Cl.  
*G01L 1/12* (2006.01)
(52) U.S. Cl.  
USPC ........................................ 73/862.69
(58) Field of Classification Search  
USPC ................. 73/779, 862.69; 324/209  
See application file for complete search history.

(56) References Cited

U.S. PATENT DOCUMENTS

| 3,740,594 | A | * | 6/1973 | Casey |
| 3,861,203 | A | * | 1/1975 | Dahle et al. ............. 335/215 |
| 4,529,900 | A | * | 7/1985 | Uzuka |
| 6,484,586 | B1 | * | 11/2002 | Dutoit et al. ............. 73/722 |
| 6,623,326 | B2 | * | 9/2003 | Judkins ............. 446/175 |
| 6,691,560 | B2 | * | 2/2004 | Abnett |
| 7,987,734 | B2 | * | 8/2011 | Maehara |
| 2002/0124657 | A1 | | 9/2002 | Wright ............. 73/760 |
| 2004/0255687 | A1 | | 12/2004 | Dukart ............. 73/779 |
| 2007/0107531 | A1 | | 5/2007 | Munz et al. ............. 73/849 |
| 2008/0034896 | A1 | | 2/2008 | Munz et al. ............. 73/862.351 |

FOREIGN PATENT DOCUMENTS

| CN | 85103183 | | 4/1987 |
| DE | 10 2005 041 030 A1 | | 3/2007 |
| JP | 60-195432 A | | 10/1985 |
| JP | 01-262431 A | | 10/1989 |
| JP | 2000-214002 A | | 8/2000 |
| JP | 2000214002 A | * | 8/2000 |
| JP | 2004-325328 A | | 11/2004 |
| JP | 2006-520915 A | | 9/2006 |

OTHER PUBLICATIONS

Extended European Search Report issued May 30, 2012, in counterpart European Patent Application No. 8792547.5.  
Office Action issued Jul. 27, 2012 in counterpart Korean Patent Application No. 10-2010-7006043, with translation.

* cited by examiner

*Primary Examiner* — Max Noori  
(74) *Attorney, Agent, or Firm* — Fitzpatrick, Cella, Harper & Scinto

(57) ABSTRACT

A magnetic force sensor includes: an action portion on which an external force acts; a sensing unit converting a force working on the action portion into an electric signal; and an outer frame having an elastic body elastically supporting the action portion and storing the sensing unit therein. The sensing unit includes a magnetic flux generation source connected with the action portion and a magnetoelectric transducer fixed on the outer frame and the magnetic flux generation source has a magnetic body therewith that controls flow of magnetic fluxes generated by the magnetic flux generation source.

2 Claims, 10 Drawing Sheets

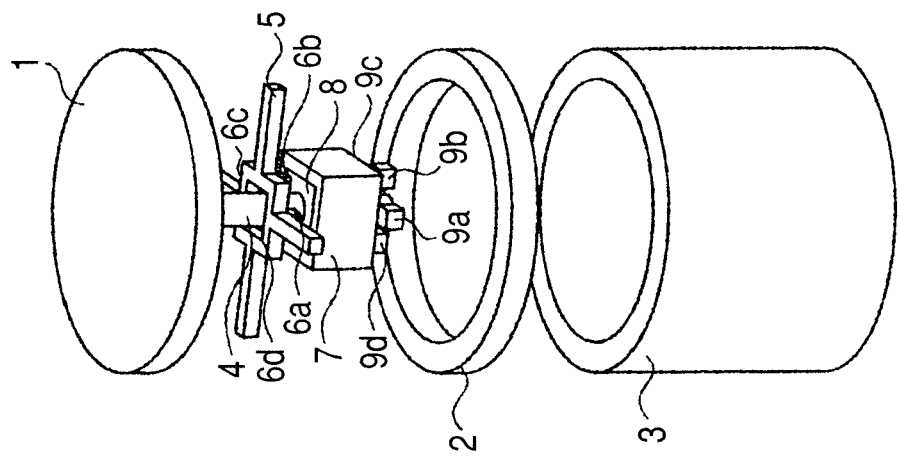
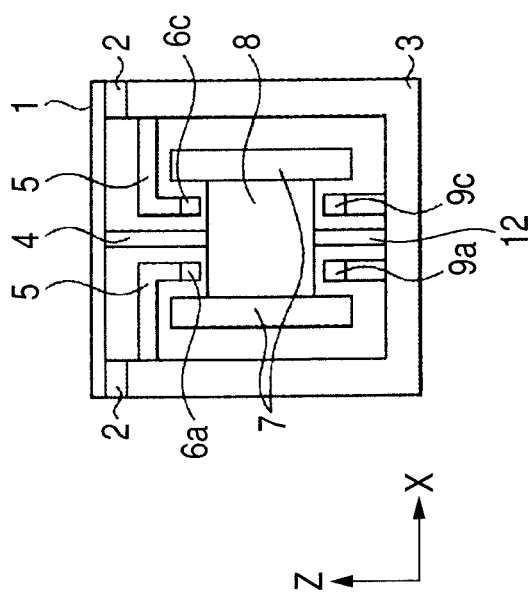

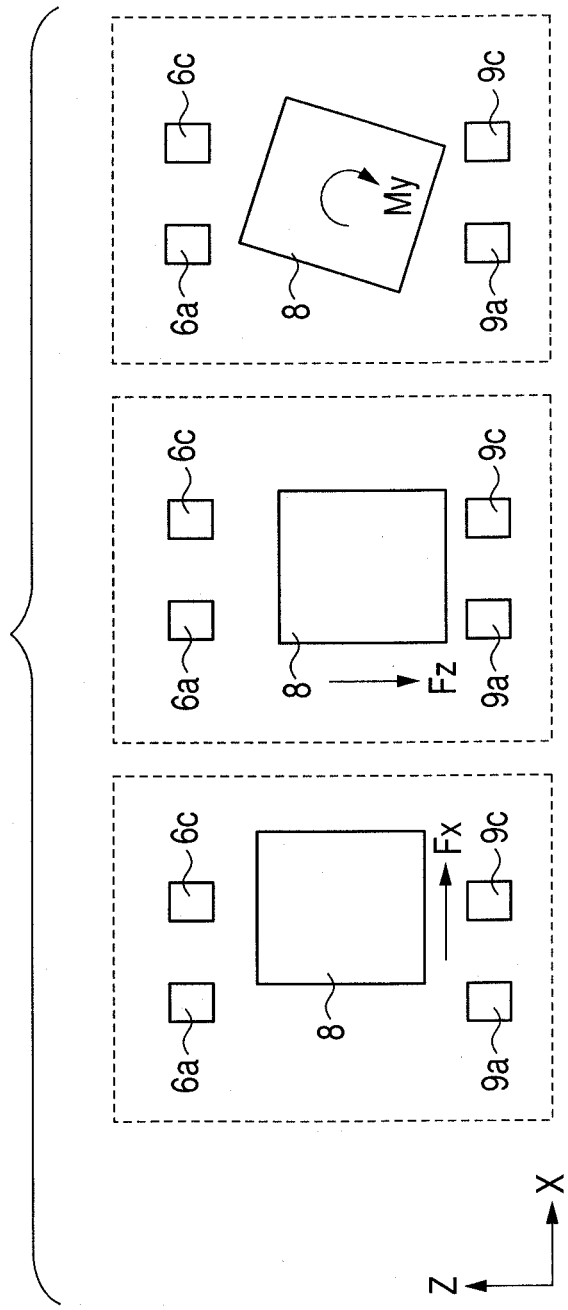

MAGNETIC FORCE SENSOR

TECHNICAL FIELD

The present invention relates to a force sensor for detecting force/moment 6 direction components and, in particular, relates to a magnetic force sensor for detecting a magnetic flux change in a magnetic flux generation source with a magnetoelectric transducer.

BACKGROUND ART

A force sensor is mounted on a wrist portion of a robot arm, for example, in assembling parts with the robot arm, and is used to detect a force/moment component generated during the assembly work and perform posture control of a hand portion of the arm. A conventional typical force sensor makes detection from a resistance change in a strain gauge, as disclosed in Japanese Patent Application Laid-Open No. H01-262431. In addition, there is also another force sensor using a method of magnetically detecting a displacement of an action portion, as disclosed in Japanese Patent Application Laid-Open No. 2004-325328.

First, FIG. 11 illustrates a conventional structural example described in Japanese Patent Application Laid-Open No. H01-262431. A force/moment component working on a strained portion is calculated from a resistance change in a plurality of strain gauges arranged on an identical beam.

Next, FIGS. 12A and 12B illustrate a conventional structural example disclosed in Japanese Patent Application Laid-Open No. 2004-325328, respectively. There are disposed a permanent magnet embedded into an elastic body and four magnetoelectric transducers (Hall elements) provided so as to face a magnetization direction axis (S-N axis) of the permanent magnet. When an action force is applied, the permanent magnet displaces and a change in magnetic flux caused by the displacement is converted into an electric signal for detection by the magnetoelectric transducer. This enables detection of three shaft force components in X-axis, Y-axis and Z-axis directions.

However, an invention of Japanese Patent Application Laid-Open No. H01-262431 is arranged with a plurality of strain gauges on an identical beam. Accordingly, when a strained portion receives a force, there occurs a problem of interference between axes when an axial strain occurs, not only in a direction in which an applied force works but also in one in which no force works. In addition, reducing the shaft interference requires one to devise a beam structure and signal processing, which are disadvantageous in terms of a desire to achieve size and cost reductions. Further, because a strain gauge uses a strain generated when a force is applied, repeated use will cause a problem with durability and reliability due to secular changes.

On the other hand, an invention of Japanese Patent Application Laid-Open No. 2004-325328 has such a structure that elements provided in no contacts are independent, respectively, which compensates for demerits of the invention of Japanese Patent Application Laid-Open No. H01-262431.

However, such a structure that a magnetic material faces a magnetoelectric transducer scatters magnetic flux and therefore, a displacement of magnetic flux density detected by the magnetoelectric transducer occurs only a little, which makes it difficult to obtain high sensitivity. Further, the magnetic material is embedded simply with an elastic body, which causes problems such as generation of a noise source having an adverse effect on peripheral apparatuses and external magnetic flux easily flowing into the magnetoelectric transducer having an adverse effect on output.

In view of the foregoing problems, it is an object of the present invention to provide a magnetic force sensor which detects force/moment in 6-axis directions using such a structure as to restrain an adverse effect of a magnetic flux generation source onto the outside and to improve reliability against noise and high sensitivity.

DISCLOSURE OF THE INVENTION

Other features and advantages of the present invention will be apparent from the following description taken in conjunction with the accompanying drawings, in which like reference characters designate the same or similar parts throughout the figures thereof.

According to the present invention, a magnetic force sensor including: an action portion on which an external force acts; a sensing unit converting a force working on the action portion into an electric signal; and an outer frame having an elastic body elastically supporting the action portion and storing the sensing unit therein, wherein the sensing unit includes a magnetic flux generation source connected with the action portion and a magnetoelectric transducer fixed on the outer frame and the magnetic flux generation source has a magnetic body therewith that controls flow of magnetic fluxes generated by the magnetic flux generation source. In addition, the magnetoelectric transducer is disposed nearer to the magnetic flux generation source side than an outer end face of the magnetic body. In addition, the magnetoelectric transducer is disposed in a region where the magnetic flux generation source is extended in a magnetization direction, and the end face of the magnetic body on the magnetization direction axis side is positioned, protruding from the end face of the magnetoelectric transducer on the magnetization direction axis side.

The magnetic force sensor according to the present invention can control magnetic flux from the magnetic flux generation source with the magnetic body by disposing the magnetic body on an outer-periphery portion of the sensing unit including the magnetic flux generation source and the magnetoelectric transducer.

By disposing the magnetic body at the outer-periphery portion of the magnetic flux generation source, a structure capable of facilitating, with the magnetic body, trapping of magnetic fluxes generated from the magnetic flux generation source is constructed, thus suppressing generation of a noise source having an adverse effect on the outside.

When magnetic noise from the outside flows in, the magnetic noise preferentially invades into a magnetic body having high permeability, which makes such a structure that a magnetoelectric transducer cannot obtain, thus attaining high reliability against magnetic noise.

In addition, magnetic fluxes flowed into the magnetoelectric transducer can be concentrated and therefore, even if a positional displacement of the magnetic flux generation source is very small, a relatively large change in magnetic fluxes is obtained, thereby increasing sensitivity.

As described above, the present invention provides a magnetic force sensor which detects force/moment in 6-axis directions with a structure which can suppress an adverse effect of an magnetic flux generation source on the outside, improve reliability against noise and increase sensitivity.

Further features of the present invention will become apparent from the following description of exemplary embodiments with reference to the attached drawings.

BRIEF DESCRIPTION OF THE DRAWINGS

FIGS. 1A and 1B are a view illustrating a structure of a magnetic force sensor according to the present invention, respectively;

FIG. 2 is a view for describing a method for calculating force/moment of the present invention;

BEST MODES FOR CARRYING OUT THE INVENTION

Figure 3A:
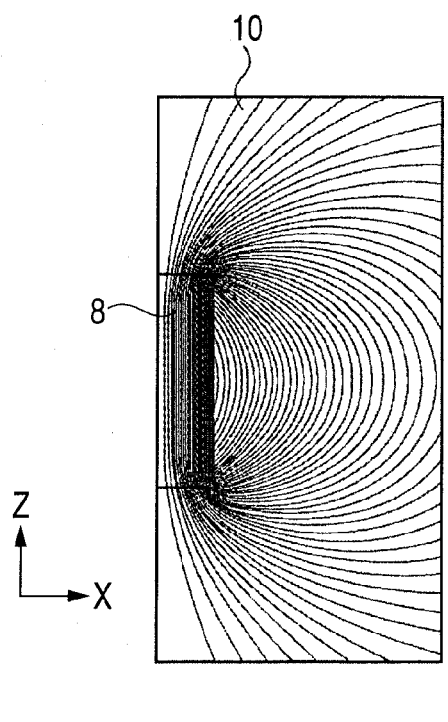
FIGS. 3A and 3B are a view illustrating lines of magnetic flux obtained from a simulation with a Z-axisymmetric secondary static magnetic field model, respectively.

Preferred embodiments of the present invention will now be described in detail in accordance with the accompanying drawings.

FIGS. 1A and 1B are a view illustrating the feature of the present invention most remarkably, respectively. FIG. 1A is a sectional view of a magnetic force sensor taken along X-Z axis and FIG. 1B is an exploded perspective view.

First, a correlation between reference numerals/characters and respective components will be made. In FIGS. 1A and 1B, reference numeral 1 denotes an action portion to which a force is applied, reference numeral 2 denotes an elastic body which generates a positional displacement when a force is applied, reference numeral 3 denotes an outer frame of a force sensor, reference numeral 4 denotes a column for supporting the action portion and a magnetic flux generation source, reference numeral 5 denotes a magnetoelectric transducer supporting portion for mounting a magnetoelectric transducer, reference characters 6a to 6d denote a magnetoelectric transducer for detecting a change in magnetic flux of the magnetic flux generation source, respectively, reference numeral 7 denotes a magnetic body for controlling a flow of magnetic flux, reference numeral 8 denotes a magnetic flux generation source for generating a magnetic flux, reference characters 9a to 9d denote a magnetoelectric transducer for detecting a change in magnetic flux of the magnetic flux generation source and reference numeral 12 denotes a magnetic flux generation source supporting portion. In the present invention, a combination of the magnetoelectric transducer and the magnetic flux generation source may be hereinafter referred to as a "sensing unit".

The action portion 1 is firmly connected to the magnetic flux generation source 8 through the highly rigid column 4. On the outer frame 3, the magnetoelectric transducers 6a to 6d are fixed at a gap to the magnetic flux generation source 8 through the magnetoelectric transducer supporting portion 5. Similarly, the magnetoelectric transducers 9a to 9d are fixed on the outer frame at a gap to the magnetic flux generation source 8.

The outer frame 3 and the action portion 1 are elastically supported so as to be displaceable to each other through the elastic body 2. The magnetic flux generation source supporting portion 12 is constructed of a low-rigid member such as an elastic body and disposed at a position facing the column 4 to maintain a posture of the magnetic flux generation source 8.

The magnetic flux generation source 8 may be a permanent magnet such as Nd—Fe—B magnet, Sm—Co magnet, Sm—Fe—N magnet and Ferrite magnet, which are typical magnets, or may be an electromagnet generating a magnetic force by winding coil around a magnetic body for energization. The magnetoelectric transducers 6, 9 are a Hall element, MR element, magnetic impedance element and flux gate element. The magnetic body 7 is constructed of a material having a permeability different from air.

When a force is applied to the action portion 1, the magnetic flux generation source 8 connected to the column 4 generates a displacement as a result of elastic deformation of the elastic body 2. Hence, an electric displacement proportional to a displacement of the magnetic flux generation source 8 is obtained from the respective magnetoelectric transducers fixed on the outer frame 3.

Referring to FIG. 2, description will be made on a calculation method for force/moment. Description will be made on a case where a force Fx in X-axis direction, a force Fz in Z-axis direction and a moment My in Y-axis direction are applied to an action portion, respectively. For easy description, FIG. 2 illustrates a force in X-axis direction, a force in Z-axis direction and a moment in Y-axis direction, respectively. When the magnetic flux generation source moves and goes farther by a force Fx in X-axis direction and "magnetic flux density variation–$\Delta$Bx" occurs at the magnetoelectric transducers 6a, 9a, "magnetic flux density displacement+$\Delta$Bx" reversely occurs at 6c and 9c, respectively. When "magnetic flux density variation–$\Delta$Bz" occurs at the magnetoelectric transducers 6a, 6c by a force Fz in Z-axis direction, "magnetic flux density displacement+$\Delta$Bz" occurs at 9a and 9c, respectively. Further, when a magnetic flux density variation $\Delta$By occurs at the magnetoelectric transducers 6a, 9c by a moment My in Y-axis direction, "magnetic flux density displacement–$\Delta$By" occurs at 6c and 9a, respectively.

If a total magnetic flux density displacement occurring at the magnetoelectric transducer 6a, a total magnetic flux density displacement occurring at the magnetoelectric transducer 6c, a total magnetic flux density displacement occurring at the magnetoelectric transducer 9a and a total magnetic flux density displacement occurring at the magnetoelectric transducer 9c are taken as ΔB6a, ΔB6c, ΔB9a and ΔB9c, respectively.

$$\Delta B6a = -\Delta Bx - \Delta Bz + \Delta By$$

$$\Delta B6c = \Delta Bx - \Delta Bz - \Delta By$$

$$\Delta B9a = -\Delta Bx + \Delta Bz - \Delta By$$

$$\Delta B9c = \Delta Bx + \Delta Bz + \Delta By$$

Next, pairs of magnetoelectric transducers having a correlation at each axis are prepared and differences are taken. A correlation refers to, for example, pairs of 6c and 9c, and 6a and 9a in X-axis direction.

$$\begin{aligned} Fx &= (\Delta B6c + \Delta B9c) - (\Delta B6a + \Delta B9a) \\ &= k_x \times \Delta Bx \\ Fz &= (\Delta B9a + \Delta B9c) - (\Delta B6a + \Delta B6c) \\ &= k_z \times \Delta Bz \\ My &= (\Delta B6a + \Delta B9c) - (\Delta B9a + \Delta B6c) \\ &= k_y \times \Delta By \end{aligned}$$

Where, $k_x$, $k_z$ and $k_y$ are proportional coefficients for converting magnetic flux density variation to force and moment.

From the above, the force sensor according to the present invention has only a term of magnetic flux density variation occurring when a force is independently applied to each axis and therefore a force occurring at each axis can be easily calculated by detecting a magnetic flux density variation. Similarly, a force Fy in Y-axis direction, moment My in X-axis direction and a moment Mz in Z-axis direction can be calculated.

As described above, forces and moments for every 3-axis, that is, 6-axis can be detected.

(First Embodiment)

Figure 3B:
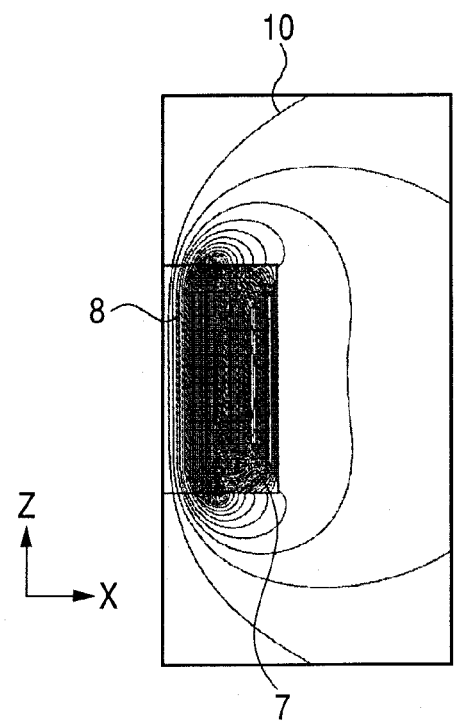

FIGS. 3A and 3B illustrate a result of magnetic field simulation, respectively. The simulation was performed with a Z-axisymmetric secondary static magnetic field model. FIG. 3A illustrates that a magnetic flux generation source is disposed, in the air, with 4 mm thickness in Z-axis direction, 2 mm thickness in X-axis direction (1 mm thickness in X-axis direction of the magnetic flux generation source illustrated because the magnetization direction axis meets Z-axis). FIG. 3B illustrates that the magnetic flux generation source is disposed with a magnetic body of 4 mm thickness in Z-axis direction and 1 mm thickness in X-axis direction. For the magnetic flux generation source, the characteristics of Nd—Fe—B magnet having residual magnetic flux density of 1.4T and coercitivity of 1000 kA/m were defined and the relative permeability of the magnetic body was set to 5000.

FIG. 3A illustrates a configuration of only a magnetic flux generation source in the air. This configuration scatters magnetic flux 10 generated from the magnetic flux generation source 8 without limit and therefore the magnetic flux may have an adverse effect upon external peripheral apparatuses. FIG. 3B illustrates such a configuration that a magnetic body is made adjacent to a magnetic flux generation source 8 along a magnetization direction axis.

It is understood that this configuration allows more magnetic flux 10 scattering to the outside to reduce in quantity as the magnetic flux 10 passes through the inside of the magnetic body 7 more frequently.

When the magnetic body is placed at an outer-periphery portion of the magnetic flux generation source so as to surround the magnetization direction axis, magnetic flux preferentially flows through a magnetic body having higher permeability than air, and the magnetic flux is restrained from scattering to the periphery thereof, thus restraining the magnetic flux generation source from becoming a noise source of affecting the outside.

Figure 4A:
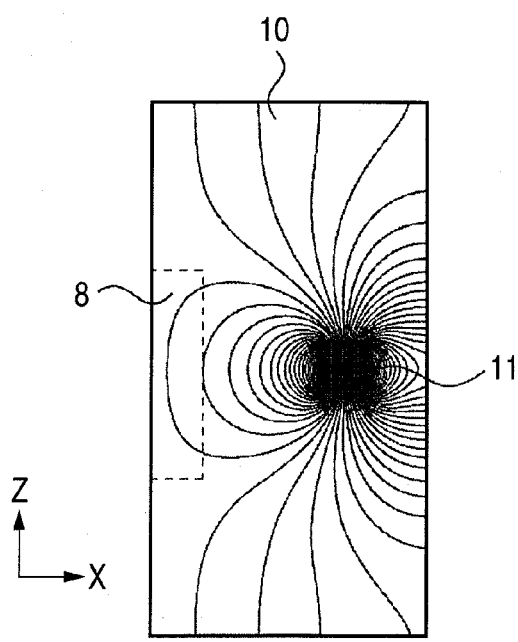
FIGS. 4A and 4B are a view illustrating lines of magnetic flux with a noise source generating magnetic fluxes to the outside, using an analysis model in FIGS. 3A and 3B.
Figure 4B:
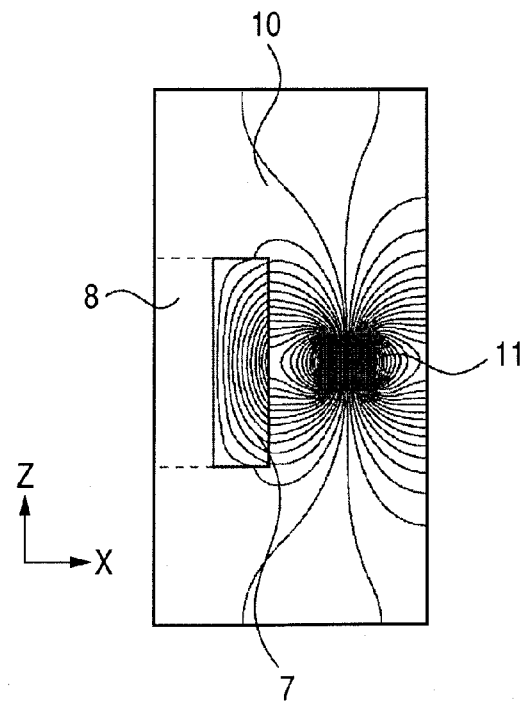

Next, FIGS. 4A and 4B illustrate, respectively, a research result of how magnetic flux generated from a noise source 11 generating magnetic flux passes through a region (a portion surrounded by dotted lines) in which the magnetic flux generation source 8 is disposed. FIG. 4A illustrates that only a noise source is disposed. This configuration has an adverse effect of magnetic flux from the noise source even if a magnetoelectric transducer is disposed at any position. On the other hand, the magnetic body 7 is disposed so as to run along Z-axis of the magnetic flux generation source 8 together with the noise source 11, as illustrated in FIG. 4B. It is understood that this structure allows magnetic noise from the outside to flow through a magnetic body having high permeability and therefore both a region in which the magnetic flux generation source 8 is disposed and a region existing in Z-axis direction relative to the magnetic flux generation source 8 reduce the number of points having an adverse effect of noise. Accordingly, the magnetoelectric transducer 6 is disposed in Z-axis direction (upward or downward in FIG. 4B) relative to the magnetic flux generation source 8, thus improving reliability against magnetic noise.

Figure 5:
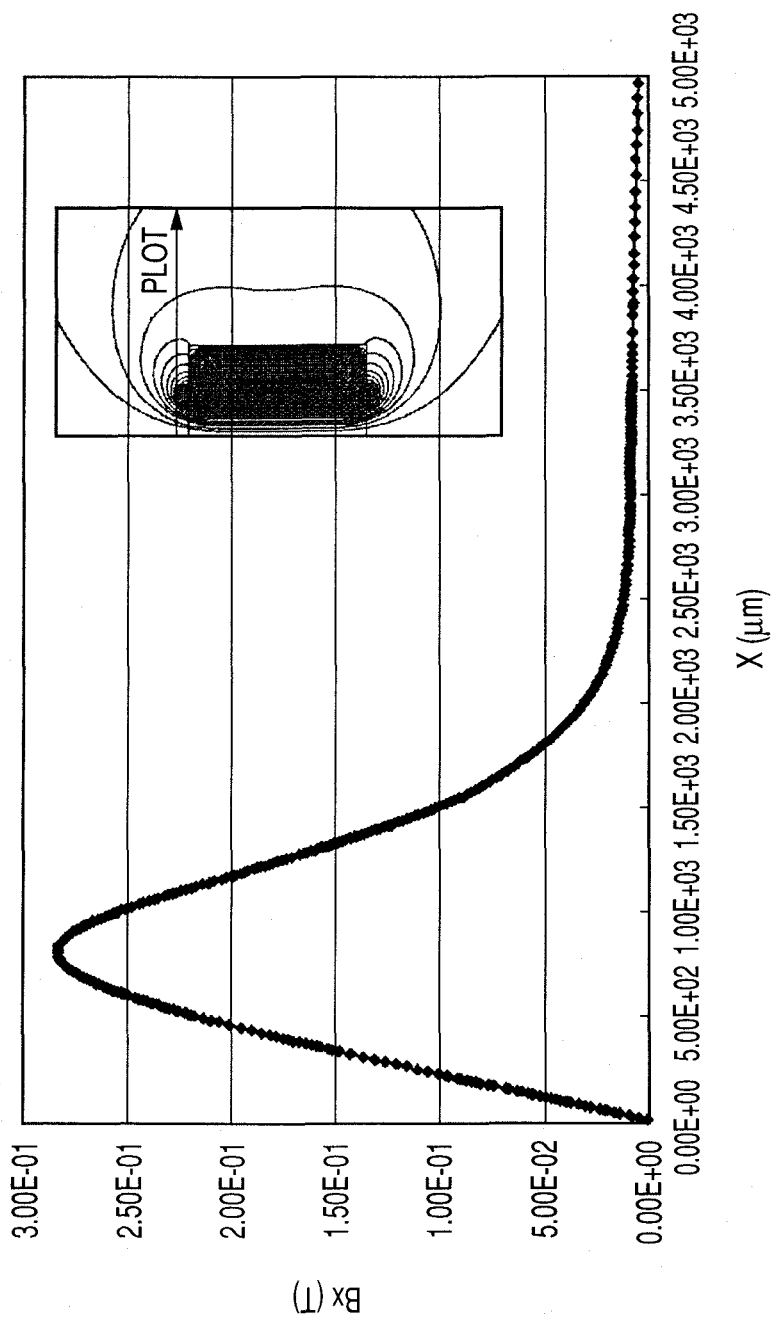
FIG. 5 is a graph illustrating X-component of magnetic flux density in X-axis direction at a position at a distance of 500 μm from a magnetic flux generation source in Z-axis direction.

Next, description will be made on the location of a magnetoelectric transducer when a magnetic body is disposed at an outer-periphery portion of the magnetic flux generation source. FIG. 5 illustrates a plot of X components of magnetic flux density in X-axis direction at a distance of 500 μm from the magnetic flux generation source in Z-axis direction in FIG. 3B model. An arrow in the figure indicates a plot position. It is seen that variation in magnetic flux density rapidly decreases around 2000 μm in X-axis direction, that is, at a boundary between the magnetic body and an air layer. A magnetic force sensor cannot detect any force with high sensitivity if changes in magnetic flux density depending upon positions are not sufficient. Accordingly, study of the location of the magnetoelectric transducer 6 for obtaining high sensitivity in X-axis direction indicates that it is preferable to dispose the magnetoelectric transducer on the magnetic flux generation source 8 side with an outer end face of the magnetic body 7 as a boundary.

(Second Embodiment)

Figure 6A:
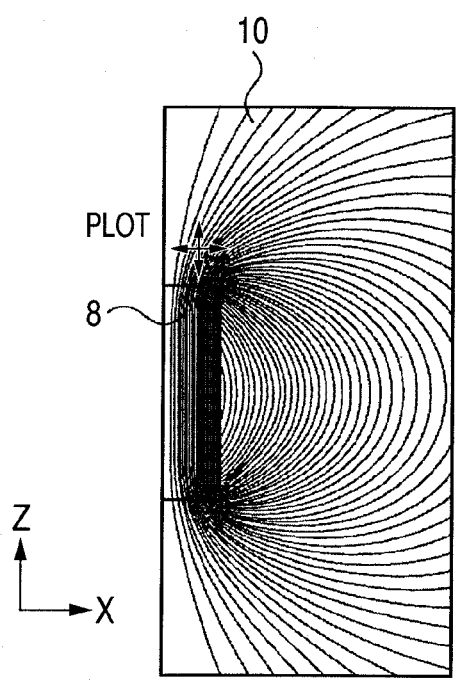
FIGS. 6A and 6B are a view illustrating lines of magnetic flux obtained from a simulation with a Z-axisymmetric secondary static magnetic field model, respectively.
Figure 6B:
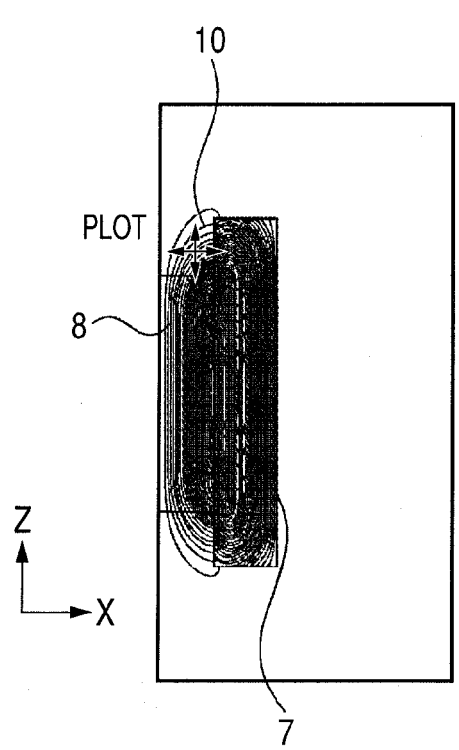

FIGS. 6A and 6B illustrate a result of magnetic field simulation, respectively. FIG. 6B illustrates a layout of the magnetic body when a thickness thereof in Z-axis direction is changed from 4 mm to 6 mm so as to be larger than a thickness of the magnetic flux generation source 8 in Z-axis direction. Conditions of FIG. 6A are the same as Experimental Example 1 of FIG. 3A.

Figure 7:
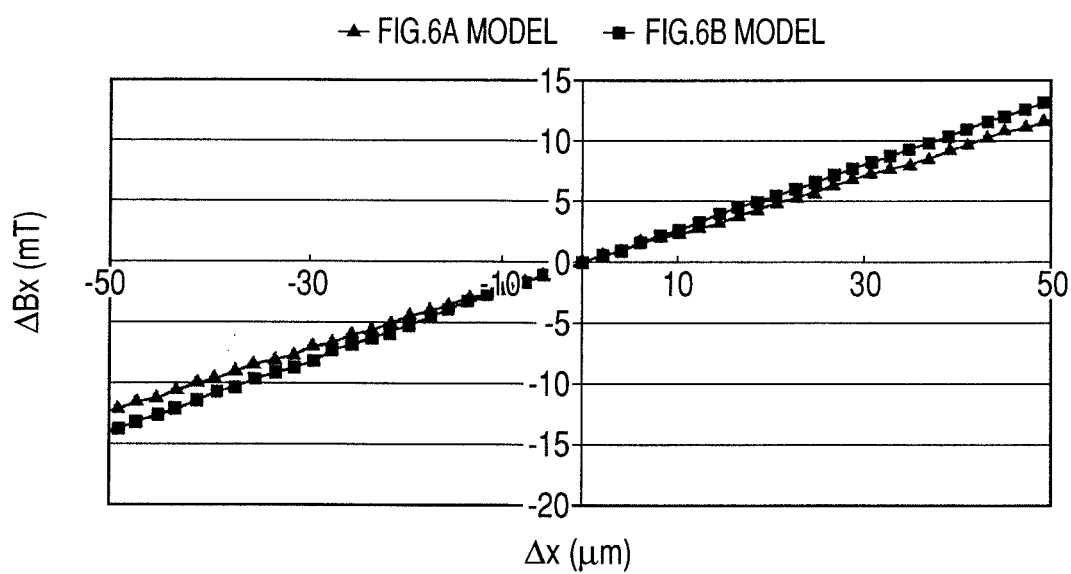
FIG. 7 is a graph illustrating a displacement of magnetic flux density at a position of a magnetoelectric transducer relative to a displacement of ±50 μm of a magnetic flux generation source in X-axis direction with the magnetoelectric transducer disposed so as to measure X-axis component of magnetic field.
Figure 8:
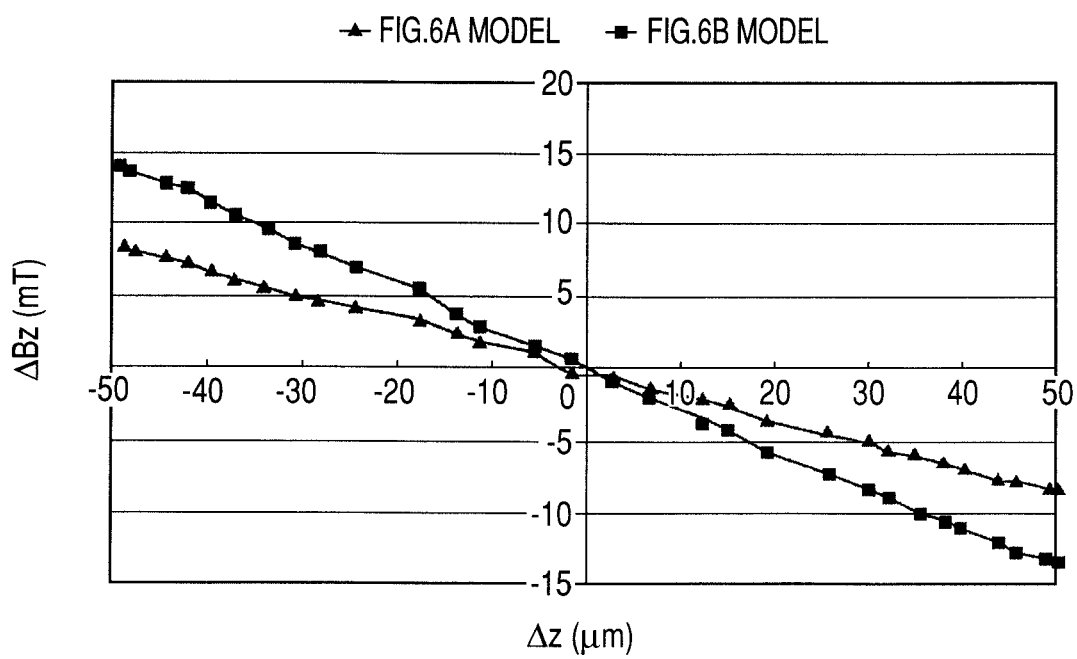
FIG. 8 is a graph illustrating a displacement of magnetic flux density at a position of a magnetoelectric transducer relative to a displacement of ±50 μm of a magnetic flux generation source in Z-axis direction with the magnetoelectric transducer disposed so as to measure X-axis component of magnetic field.

The magnetoelectric transducer is located at a distance of 500 μm in X-axis direction and 500 μm from the magnetic flux generation source in Z-axis direction to measure X-component of a magnetic field. If variations in X-component of magnetic flux density appearing at the magnetoelectric transducer when the magnetic flux generation source is displaced by ±50 μm in X-axis direction or ±50 μm in Z-axis direction are taken as ΔBxx and ΔBxz, respectively, graphs as illustrated in FIGS. 7 and 8 are obtained. An arrow on FIGS. 6A and 6B indicates a plot position. FIG. 7 illustrates that a displacement in magnetic flux density upon displacement in X-axis direction is ΔBxx and FIG. 8 illustrates that a displacement in magnetic flux density upon displacement in Z-axis direction is ΔBxz. FIGS. 7 to 10, taking a displacement taken on the horizontal axis and a variation from an initial position of the magnetic flux density B on the vertical axis, respectively, illustrate that sensitivity becomes higher as an inclination is larger.

Figure 9:
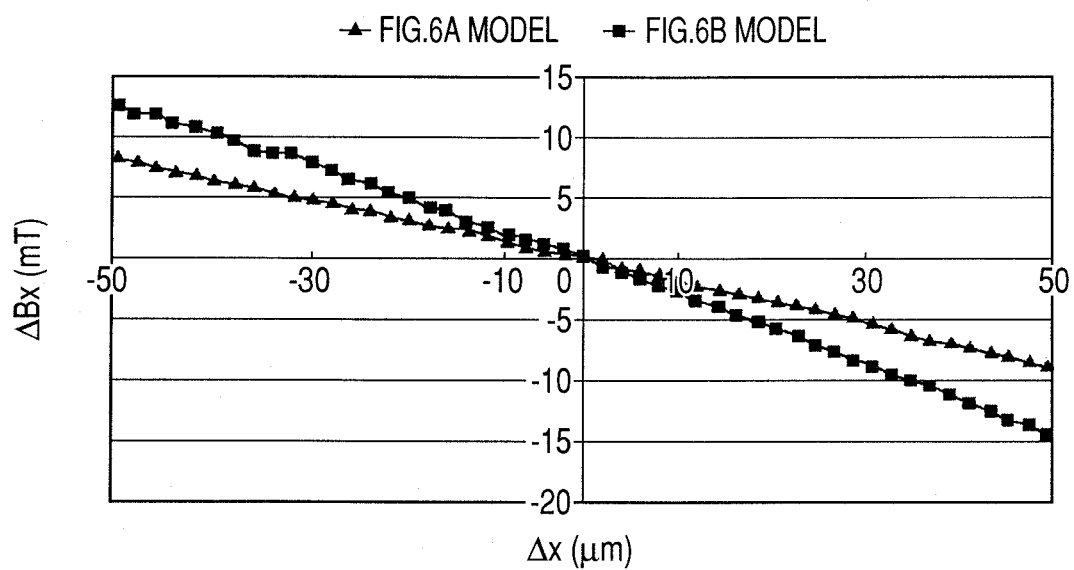
FIG. 9 is a graph illustrating a displacement of magnetic flux density at a position of a magnetoelectric transducer relative to a displacement of ±50 μm of a magnetic flux generation source in X-axis direction with the magnetoelectric transducer disposed so as to measure Z-axis component of magnetic field.
Figure 10:
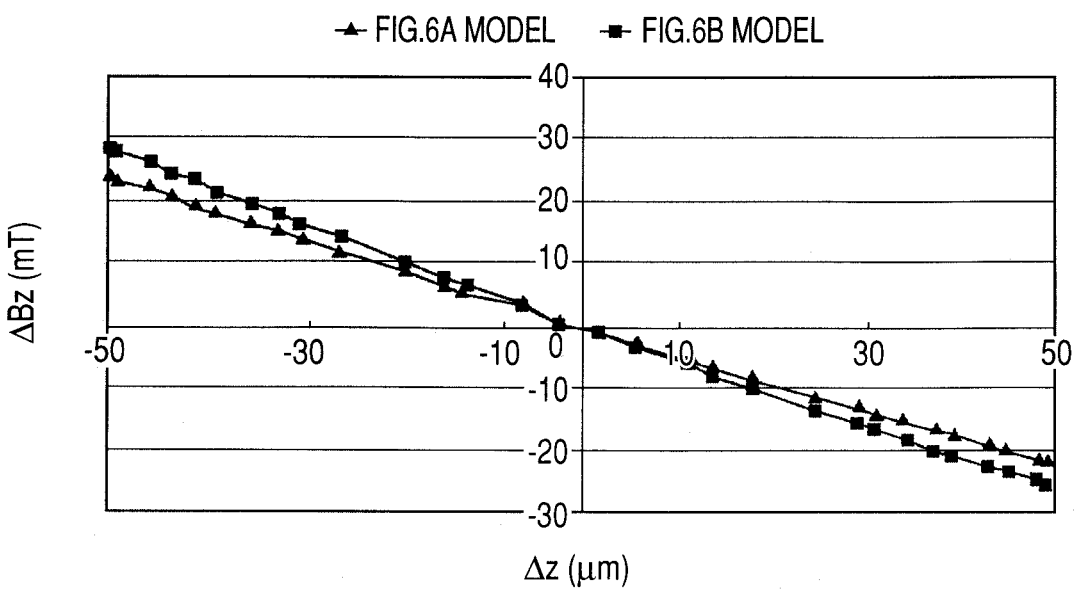
FIG. 10 is a graph illustrating a displacement of magnetic flux density at a position of a magnetoelectric transducer relative to a displacement of ±50 μm of a magnetic flux generation source in Z-axis direction with the magnetoelectric transducer disposed so as to measure Z-axis component of magnetic field.
Figure 11:
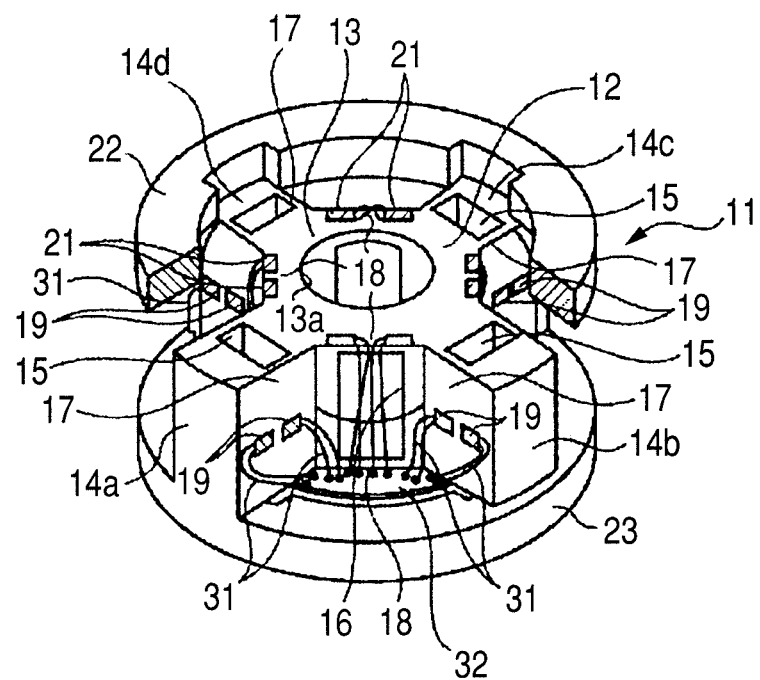
FIG. 11 is a view illustrating a structure of a conventional strain gauge force sensor.
Figure 12A:
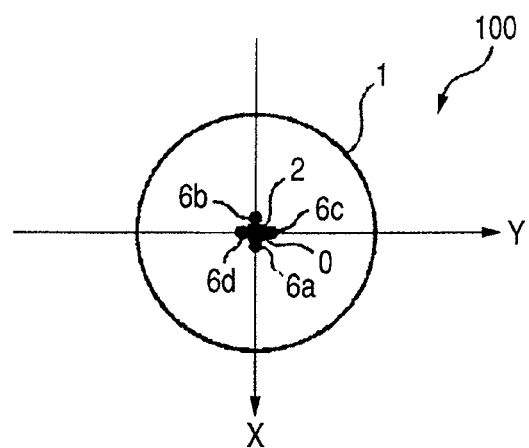
FIGS. 12A and 12B are a view illustrating a structure of a conventional magnetic force sensor, respectively.
Figure 12B:
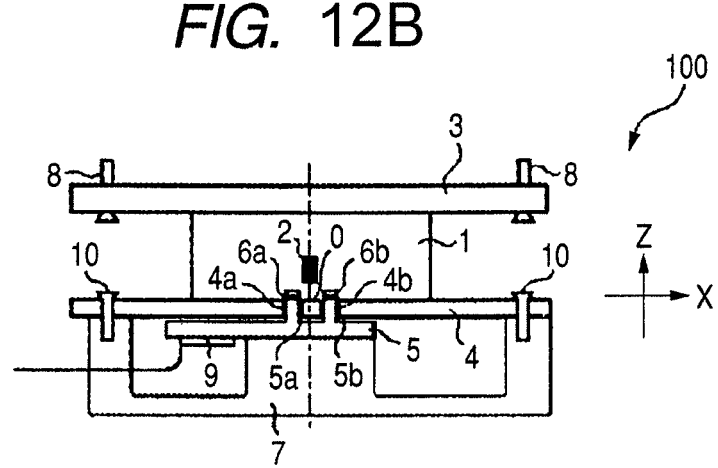

Next, the magnetoelectric transducer is disposed at the initial position again, so that Z-component of a magnetic field is measurable. At that time, if displacements in Z-component of magnetic flux density appearing at the magnetoelectric transducer when the magnetic flux generation source is displaced by ±50 μm in X-axis direction or ±50 μm in Z-axis direction are taken as ΔBzx and ΔBzz, respectively, graphs as illustrated in FIGS. 9 and 10 are obtained. An arrow on FIGS. 6A and 6B indicates a plot position. FIG. 9 illustrates that a displacement in magnetic flux density upon displacement in X-axis direction is ΔBzx and FIG. 10 illustrates that a displacement in magnetic flux density upon displacement in Z-axis direction is ΔBzz. The left of a suffix under ΔB indicates a direction of magnetic flux density to be measured and the right thereof indicates a displacement direction.

The magnetoelectric transducer was disposed so that X-component and Z-component of a magnetic field are measurable. In any case, it is understood that, by disposing the magnetic body, an inclination of a changing curve becomes larger, that is, sensitivity becomes higher. This is because why disposing the magnetic body having permeability higher than air controls a flow of magnetic flux, thus concentrating magnetic flux flowing into the magnetoelectric transducer. Specifically, it is understood that disposing the magnetic body so as to surround the whole sensing unit by protruding an end face of the magnetic body on magnetization direction axis side from the end face of the magnetoelectric transducer on magnetization direction axis side provides an effect of obtaining higher sensitivity than a case where only the magnetic flux generation source and only the magnetoelectric transducer are disposed.

As seen from flows of magnetic flux lines in FIGS. 3B and 6B, reducing the thickness of the magnetic flux generation source in magnetization direction more than that of the magnetic body makes a structure of capable of easily trapping magnetic flux emitted from the magnetic flux generation source. Specifically, disposing the outer end face of the magnetic body on the outer-periphery portion of the sensing unit, protruding from the outer end face of the magnetic flux generation source can further restrain generation of a noise source from the magnetic flux generation source given to the outside.

Such a structure allows the magnetoelectric transducer to have a structure the periphery of which is surrounded by the magnetic body, thereby attaining further higher reliability against magnetic noise.

The present invention is not limited to the above embodiments and various changes and modifications can be made within the spirit and scope of the present invention. Therefore to apprise the public of the scope of the present invention, the following claims are made.

This application claims the benefit of Japanese Patent Application No. 2007-221295, filed Aug. 28, 2007, which is hereby incorporated by reference herein in its entirety.

The invention claimed is:

1. A magnetic force sensor comprising:
   an action portion on which an external force acts;
   a sensing unit converting a force working on said action portion into an electric signal; and
   an outer frame having an elastic body elastically supporting said action portion and storing said sensing unit therein, wherein
   said sensing unit includes a magnetic flux generation source coupled to said action portion and a magnetoelectric transducer fixed on said outer frame,
   said magnetic flux generation source has a magnetic body therewith which is placed adjacent to said magnetic flux generation source so as to surround the magnetization direction axis of said magnetic flux generation source,
   said magnetoelectric transducer is disposed nearer to said magnetic flux generation source side than to an outer end face of said magnetic body, and
   a plurality of magnetoelectric transducers are arranged so as to hold the magnetization direction axis.

2. The magnetic force sensor according to claim 1, wherein said magneto-electric transducer is disposed in a region where said magnetic flux generation source is extended in a magnetization direction, and said end face of said magnetic body on the magnetization direction axis side is positioned, protruding from an end face of said magneto-electric transducer on the magnetization direction axis side.

* * * * *